(12) United States Patent
Mu

(10) Patent No.: US 10,579,185 B2
(45) Date of Patent: Mar. 3, 2020

(54) DISPLAY PANEL, PHOTOSENSITIVE TOUCH CIRCUIT AND CONTROL METHOD THEREOF

(71) Applicants: BOE TECHNOLOGY GROUP CO., LTD., Beijing (CN); Hefei Xinsheng Optoelectronics Technology Co., Ltd., Anhui (CN)

(72) Inventor: Suzhen Mu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 101 days.

(21) Appl. No.: 15/839,907

(22) Filed: Dec. 13, 2017

(65) Prior Publication Data

US 2018/0267664 A1 Sep. 20, 2018

(30) Foreign Application Priority Data

Mar. 14, 2017 (CN) .......................... 2017 1 0150766

(51) Int. Cl.
*G06F 3/041* (2006.01)
*G09G 3/36* (2006.01)

(52) U.S. Cl.
CPC .......... *G06F 3/0416* (2013.01); *G06F 3/0412* (2013.01); *G09G 3/3674* (2013.01); *G09G 3/3685* (2013.01)

(58) Field of Classification Search
CPC ...... G06F 3/0416; G06F 3/0412; G06F 3/042; G09G 3/3674; G09G 3/3685

(Continued)

(56) References Cited

U.S. PATENT DOCUMENTS 5,838,308 A * 11/1998 Knapp .................. G06F 3/0412
345/173
7,184,009 B2 * 2/2007 Bergquist ............ G02F 1/13338
345/173
(Continued)

FOREIGN PATENT DOCUMENTS

CN 103019476 A 4/2013
CN 104102382 A 10/2014
(Continued)

OTHER PUBLICATIONS

First Office Action for Chinese Patent Application No. 201710150766.1 dated May 24, 2019.

*Primary Examiner* — Benyam Ketema
(74) *Attorney, Agent, or Firm* — Calfee, Halter & Griswold LLP

(57) ABSTRACT

The present disclosure is directed to a photosensitive touch circuit and a control method thereof. The circuit includes a first switch unit, a driving switch unit, a photosensitive switch unit, a first storage capacitor, and a second storage capacitor, wherein: the first switch unit is connected to a data signal line and transmits a data signal to the driving switch unit in response to a first control signal; the driving switch unit is connected to a liquid crystal capacitor and the first storage capacitor, and writes a received data signal thereto in response to a second control signal; and the photosensitive switch unit is connected to the second storage capacitor, generates a touch signal, and outputs a signal in the second storage capacitor to the data signal line through the first switch unit in response to a third control signal.

9 Claims, 3 Drawing Sheets

(58) Field of Classification Search
USPC .......................................................... 345/175
See application file for complete search history.

(56) References Cited

U.S. PATENT DOCUMENTS

| | | | | |
|---|---|---|---|---|
| 7,652,663 B2* | 1/2010 | Sun | ...................... | G09G 3/3233 |
| | | | | 315/169.3 |
| 7,773,139 B2* | 8/2010 | Den Boer | ......... | H01L 27/14609 |
| | | | | 345/82 |
| 7,940,252 B2* | 5/2011 | Chuang | ................... | G06F 3/042 |
| | | | | 345/175 |
| 9,983,755 B2* | 5/2018 | Yang | ..................... | G06F 3/0412 |
| 2001/0055008 A1* | 12/2001 | Young | ..................... | G09G 3/3233 |
| | | | | 345/204 |
| 2003/0076295 A1* | 4/2003 | Nakajima | ........... | G06F 3/03545 |
| | | | | 345/156 |
| 2004/0113877 A1* | 6/2004 | Abileah | ................ | G06F 3/0412 |
| | | | | 345/92 |
| 2006/0017710 A1* | 1/2006 | Lee | .................... | G02F 1/13338 |
| | | | | 345/173 |
| 2006/0033729 A1* | 2/2006 | Yoshida | ................ | G06F 3/0412 |
| | | | | 345/207 |
| 2006/0214893 A1* | 9/2006 | Tseng | ................... | G06F 3/0412 |
| | | | | 345/82 |
| 2007/0040772 A1* | 2/2007 | Kim | .................... | G09G 3/3233 |
| | | | | 345/76 |
| 2007/0109239 A1* | 5/2007 | Den Boer | ........... | G02F 1/13338 |
| | | | | 345/87 |
| 2010/0238135 A1* | 9/2010 | Brown | ................... | G06F 3/0412 |
| | | | | 345/175 |
| 2012/0061556 A1* | 3/2012 | Chan | .................... | G09G 3/3233 |
| | | | | 250/214 R |
| 2013/0100077 A1* | 4/2013 | Chung | .................... | G06F 3/042 |
| | | | | 345/175 |
| 2013/0201085 A1* | 8/2013 | Chang | .................. | G09G 3/3258 |
| | | | | 345/76 |
| 2015/0002414 A1* | 1/2015 | Tan | ....................... | G06F 3/0412 |
| | | | | 345/173 |
| 2015/0049046 A1* | 2/2015 | Tan | ....................... | G06F 3/0412 |
| | | | | 345/174 |
| 2015/0103037 A1* | 4/2015 | Wu | ..................... | G09G 3/3233 |
| | | | | 345/174 |
| 2015/0193045 A1* | 7/2015 | Zhou | .................... | G09G 3/3233 |
| | | | | 345/174 |
| 2015/0325171 A1* | 11/2015 | Zhou | .................... | G09G 3/3233 |
| | | | | 345/80 |
| 2016/0179256 A1* | 6/2016 | Yang | ..................... | G06F 3/0412 |
| | | | | 345/173 |
| 2017/0220194 A1* | 8/2017 | Wu | ......................... | G06F 3/042 |

FOREIGN PATENT DOCUMENTS

| | | |
|---|---|---|
| CN | 104200784 A | 12/2014 |
| CN | 105955532 A | 9/2016 |

* cited by examiner

Select

Touch

Signal on
data line

Input  Output

Select

Touch

Signal on
data line

Input  Output

US 10,579,185 B2

DISPLAY PANEL, PHOTOSENSITIVE TOUCH CIRCUIT AND CONTROL METHOD THEREOF

CROSS-REFERENCE TO RELATED APPLICATIONS

The present application claims priority to Chinese Patent Application No. 201710150766.1, filed on Mar. 14, 2017, the entire contents of which are incorporated herein by reference.

TECHNICAL FIELD

The present disclosure relates to the field of display technology, and more particularly to a photosensitive touch circuit and a control method thereof, and a display panel.

BACKGROUND

With a rapid development of display technology, a touch screen as a simple and convenient way of man-machine interaction is widely used in various types of electronic display products. At present, according to a classification based on a principle thereof, a touch screen may include a resistive touch screen, a capacitive touch screen, a photosensitive touch screen and so on.

It should be noted that, the information disclosed in the above described background portion is only for enhancing the understanding of the background of the present disclosure, and thus, it may contain information that does not form the prior art known by those ordinary skilled in the art.

SUMMARY

An objection of the present disclosure is to provide a photosensitive touch circuit and a control method thereof, and a display panel.

Other characteristics and advantages of the present disclosure will become apparent from the following detailed description, or in part, will be obtained by the practice of the present disclosure.

According to a first aspect of the present disclosure, there is provided a photosensitive touch circuit, including a first switch unit, a driving switch unit, a photosensitive switch unit, a first storage capacitor, and a second storage capacitor, wherein: the first switch unit is connected to a data signal line and configured to be turned on in response to a first control signal, to transmit a data signal on the data signal line to the driving switch unit; the driving switch unit is connected to a liquid crystal capacitor and the first storage capacitor, and configured to be turned on in response to a second control signal, to write a received data signal to the liquid crystal capacitor and the first storage capacitor; and the photosensitive switch unit is connected to the second storage capacitor, configured to generate a touch signal in response to an optical signal and to store a generated signal to the second storage capacitor, and configured to be turned on in response to a third control signal, to output a signal in the second storage capacitor to the data signal line through the first switch unit.

According to an aspect of the present disclosure, there is provided a display panel including the photosensitive circuit according to the above aspect.

According to an aspect of the present disclosure, there is provided a control method of a photosensitive touch circuit for controlling the photosensitive touch circuit according to the above aspect, including: in a display stage, controlling the first switch unit to be turned on by the first control signal, controlling the driving switch unit to be turned on and the photosensitive switch unit to be turned off by the second control signal, and transmitting the data signal on the data signal line to the driving switch unit through the driving switch unit for displaying; and in a touch stage, controlling the first switch unit to be turned on by the first control signal, controlling the driving switch unit to be turned off and the photosensitive switch unit to be turned on by the second control signal, generating a touch signal in response to a touch operation and storing a generated signal in the second storage capacitor, and outputting a signal in the second storage capacitor to the data signal line through the first switch unit.

It should be understood that the general description above and the detailed description below are exemplary and explanatory only and do not limit the scope of the present disclosure.

BRIEF DESCRIPTION OF THE DRAWINGS

The drawings herein, which are incorporated into and constitute a part of this specification, illustrate embodiments of the present disclosure, and together with the description, serve to explain principle of the present disclosure. It will be apparent that, the drawings described below are merely some embodiments of the present disclosure, and other drawings may be obtained according to those drawings by those skilled in the art without any inventive work.

REFERENCE SIGNS

Figure 1:
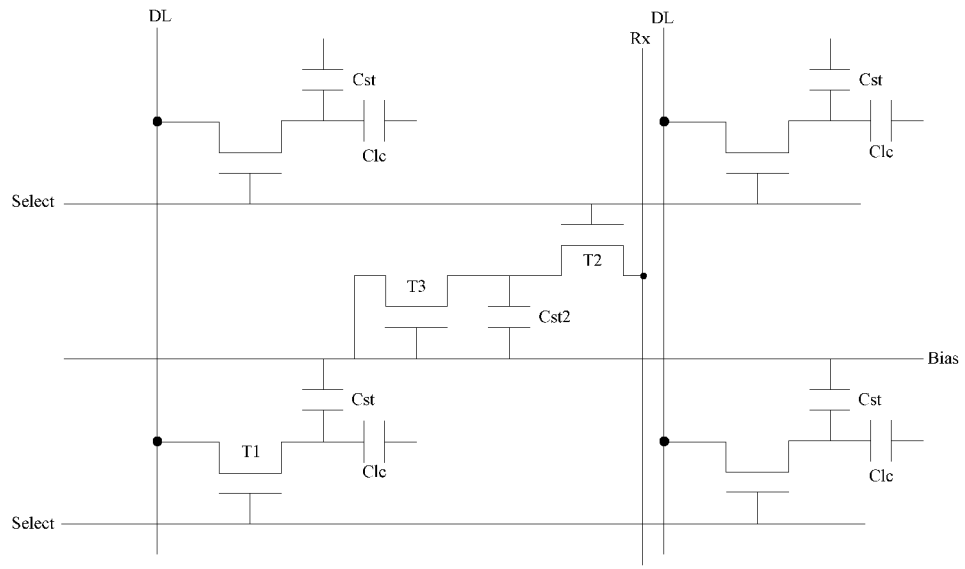
FIG. 1 schematically shows a diagram of a photosensitive touch circuit in a technical solution according to an example of the present disclosure.

DL: data line
Rx: line for receiving signal read by transistor T2
Cst: storage capacitor
Cst1: first storage capacitor
Cst2: second storage capacitor
Clc: liquid crystal capacitor
Com: common electrode
Bias: bias voltage
Select: selection control line
Touch: touch control line

DETAILED DESCRIPTION

Exemplary embodiments will now be described more fully with reference to the accompanying drawings. However, the exemplary embodiments may be embodied in many forms and should not be construed as limited to examples set forth herein; rather, those embodiments are provided so that the present disclosure will be more comprehensive and complete, and will fully convey concepts of the exemplary embodiments to those skilled in the art. Features, structures, or characteristics described may be combined in one or more embodiments in any suitable manner. In the following description, numerous specific details are set forth to make a full understanding of the embodiments of the present disclosure. However, those skilled in the art will appreciate that the technical solution of the present disclosure may be practiced without one or more of the particular details, or by other methods, components, devices, steps, and the like. In other instances, the common technical knowledge is not shown or described in detail to avoid that the accessories are better than the main part to make various aspects of the present disclosure obscure.

In addition, the drawings are merely illustrative of the present disclosure and are not necessary to scale. Same reference numerals in the drawings denote same or similar parts, and thus a repeated description thereof will be omitted. Some of the block diagrams shown in the figures are functional entities that do not necessarily correspond to physical or logical independent entities. These functional entities may be realized in a software form, or realized in one or more hardware modules or integrated circuits, or realized in different networks and/or processor devices and/or microcontroller devices.

In an example of the present disclosure, a photosensitive touch circuit that utilizes a photosensitive function to achieve a touch function is shown in FIG. 1. In FIG. 1, the photosensitive touch circuit includes a first thin film transistor T1, a read transistor T2, and a photosensitive transistor T3. The first thin film transistor T1 is used to write a signal on a data line DL to a storage capacitor Cst and a liquid crystal capacitor Clc in response to a selection control signal Select. The read transistor T2 is used to read a signal stored in a storage capacitor Cst2 in response to the selection control signal Select. The photosensitive transistor T3 is used to generate a touch signal in response to an optical signal and to store a generated signal in the storage capacitor Cst2, and the photosensitive transistor T3 is turned on in response to a bias voltage signal Bias. There are two longitudinal lines in such design: the data line DL and a line RX for receiving the signal read by the read transistor T2.

However, on one hand, such circuit structure is relatively complicated, which impairs aperture ratio. On the other hand, since the storage capacitor Cst2 and a downstream storage capacitor Cst are connected in series, charges stored in the downstream storage capacitor Cst are affected by charge/discharge of the storage capacitor Cst2, which causes noise, and thus degrades display quality.

Figure 2:
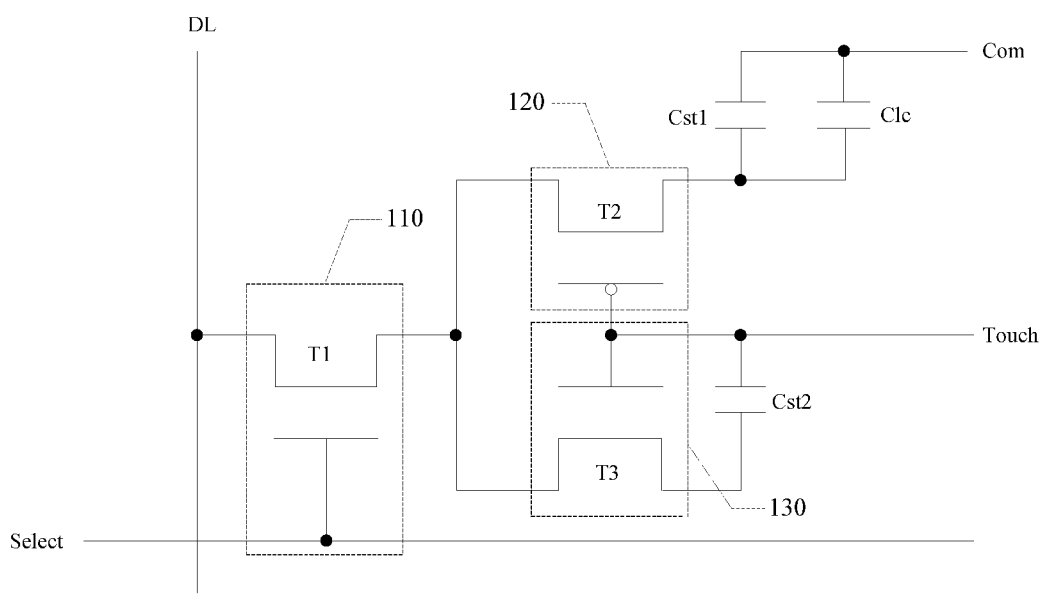
FIG. 2 schematically shows a diagram of a photosensitive touch circuit according to an exemplary embodiment of the present disclosure.

Another exemplary embodiment of the present disclosure provides a photosensitive touch circuit. As shown in FIG. 2, the photosensitive touch circuit may include a first switch unit 110, a driving switch unit 120, a photosensitive switch unit 130, a first storage capacitor Cst1, and a second storage capacitor Cst2.

The first switch unit 110 is connected to a data signal line and is turned on in response to a first control signal, i.e., a signal Select, so as to transmit a data signal on the data signal line to the driving switch unit 120.

The driving switch unit 120 is connected to a liquid crystal capacitor Clc and the first storage capacitor Cst1, and is turned on in response to a second control signal, so as to write a received data signal to the liquid crystal capacitor Clc and the first storage capacitor Cst1.

The photosensitive switch unit 130 is connected to the second storage capacitor Cst2, generates a touch signal in response to an optical signal and stores a generated signal to the second storage capacitor Cst2, and is turned on in response to a third control signal, so as to output a signal in the second storage capacitor Cst2 to the data signal line through the first switch unit.

In the photosensitive control circuit according to the present exemplary embodiment, in comparison with the prior art, on one hand, the data signal line and the first switch unit may be used multiply, so that a longitudinal line is reduced and the number of switch units is relatively small, which simplifies the circuit structure, and thus an aperture ratio may be increased. On the other hand, the driving switch unit and the photosensitive switch unit are controlled to be turned on/off by the second control signal, which may prevent charging/discharging of storage capacitors from being affected by one another, so that noise may be reduced and display quality may be improved.

Hereinafter, the connection relationship of the photosensitive touch circuit in the present exemplary embodiment will be described in detail with reference to FIG. 2.

A design of 3T2C is used in the present exemplary embodiment. As shown in FIG. 2, the first switching unit 110 includes a first thin film transistor T1, the driving switch unit 120 includes a second thin film transistor T2, and the photosensitive switch unit 130 includes a third thin film transistor T3. The first thin film transistor T1 includes a first terminal connected to the data signal line, a second terminal connected to a first terminal of the second thin film transistor T2, and a control terminal receiving the first control signal such as a selection control signal Select. The second thin film transistor T2 includes a first terminal connected to the second terminal of the first thin film transistor T1, a second terminal connected to the liquid crystal capacitor Clc and the first storage capacitor Cst1, and a control terminal receiving the second control signal such as a touch signal Touch. The third thin film transistor T3 includes a first terminal connected to the second terminal of the first thin film transistor T1, a second terminal connected to the second storage capacitor Cst2, and a control terminal receiving the third control signal such as the touch signal Touch.

It should be noted that, in the present exemplary embodiment, the second control signal may be a high level signal, and the third control signal is a low level signal when the second control signal is a high level signal. However, the present disclosure is not limited thereto, for example, according to types of thin film transistors, the second control signal may be a low level signal, and the third control signal is a high level signal when the second control signal is a low level signal, which also falls within the scope of the present disclosure.

Further, in the present exemplary embodiment, the second storage capacitor Cst2 includes a first terminal connected to the second terminal of the third thin film transistor T3, and a second terminal connected to a second control signal line. Both of a first terminal of the first storage capacitor Cst1 and a first terminal of the liquid crystal capacitor Clc are connected to the second terminal of the second thin film transistor T2, and both of a second terminal of the first storage capacitor Cst1 and a second terminal of the liquid crystal capacitor Clc are connected to a common electrode Com.

It should be noted that, in the present exemplary embodiment, both the first thin film transistor and the third thin film transistor may be N-type thin film transistors, and in the case where both the first thin film transistor and the third thin film transistor are N-type thin film transistors, the second thin film transistor is a P-type thin film transistor. However, the exemplary embodiment of the present disclosure is not limited thereto, for example, both the first thin film transistor and the third thin film transistor may be P-type thin film transistors, and in the case where both the first thin film transistor and the third thin film are P-type thin film transistors, the second thin film transistor is an N-type thin film transistor. In addition, in the present exemplary embodiment, a first terminal of a transistor is a source electrode, a second terminal thereof is a drain electrode, and a control terminal thereof is a gate electrode. However, the exemplary embodiment of the present disclosure is not limited thereto, for example, the first terminal of the transistor may be a drain electrode, and the second terminal thereof may a source electrode, which also falls within the scope of the present disclosure.

Further, for different types of transistors, a level signal inputted by respective signal terminal and a timing state thereof may be changed accordingly. A display control stage and a touch control stage of the photosensitive touch circuit in the present exemplary embodiment will be described below with reference to FIG. 3.

Figure 3:
FIG. 3 schematically shows a driving timing diagram of a photosensitive touch circuit according to an exemplary embodiment of the present disclosure.
Figure 3:
Figure 3:
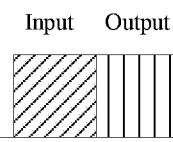

In the present exemplary embodiment, a case wherein both the first thin film transistor and the third thin film transistor may be N-type thin film transistors and the second thin film transistor is a P-type thin film transistor will be described. As shown in FIG. 3, in a display control stage, the selection control signal Select is at a high level, the touch control signal Touch is at a low level, a rising edge of the touch control signal is within a high level range of the selection control signal, the data signal is at a high level, and the data signal line is in a data input state. In the touch control stage, the selection control signal is at a high level, the touch control signal is at a high level, a falling edge of the touch control signal has a same timing as a falling edge of the selection control signal, the data signal is at a high level, and the data signal line is in a data output state.

In the present exemplary embodiment, in the display control stage, the selection control signal Select is at a high level, and since the first thin film transistor is an N-type thin film transistor and the control terminal of the first thin film transistor receives the selection control signal, the first thin film transistor is turned on. The touch control signal Touch is at a low level, and since the second thin film transistor is a P-type thin film transistor and the control terminal of the second thin film transistor receives the touch control signal, the second thin film transistor is turned on. In addition, since the third thin film transistor is an N-type thin film transistor, and the control terminal of the third thin film transistor receives the touch control signal, the third thin film transistor is turned off.

Further, since the first switching unit is connected to the data signal line, the data signal of the data signal line may be transmitted to the driving switch unit when the first thin film transistor of the first switching unit is turned on in response to the selection control signal.

In the present exemplary embodiment, since the driving switch unit is connected to the liquid crystal capacitor and the first storage capacitor, a received data signal may be written into the liquid crystal capacitor and the first storage capacitor, that is, the liquid crystal capacitor and the first storage capacitor is charged to display contents of the data signal, when the second thin film transistor of the driving switch unit is turned on in response to the touch control signal.

In addition, in the present exemplary embodiment, in the touch control stage, the selection control signal Select is at a high level, and since the first thin film transistor is an N-type thin film transistor and the control terminal of the first thin film transistor receives the selection control signal, the first thin film transistor is turned on. The touch control signal Touch is at a high level, and since the second thin film transistor is a P-type thin film transistor and the control terminal of the second thin film transistor receives the touch control signal, the second thin film transistor is turned off. In addition, since the third thin film transistor is an N-type thin film transistor, and the control terminal of the third thin film transistor receives the touch control signal, the third thin film transistor is turned on.

Further, in the present exemplary embodiment, the photosensitive switch unit is connected to the second storage capacitor, and a touch signal may be generated in response to an optical signal and the generated signal may be stored in the second storage capacitor. Therefore, when the third thin film transistor of the photosensitive switch unit is turned on in response to the touch control signal, the signal stored in the second storage capacitor may be output to the data signal line through the first switch unit.

Further, in the present exemplary embodiment, the optical signal may be a touch signal generated by a touch on a touch screen, for example, a touch on the touch screen may indicate a changed light intensity, no touch may indicate a constant light intensity, and the present disclosure is not limited thereto.

Further, in the present exemplary embodiment, the photosensitive transistor T3 may be an N-type transistor or a P-type transistor, and the present disclosure is not particularly limited thereto. When the photosensitive transistor T3 is an N-type transistor, the photosensitive transistor T3 may be turned on when the signal of the touch signal line is at a high level. When the photosensitive transistor T3 is a P-type transistor, the photosensitive transistor T3 is turned on when the signal of the touch signal line is at a low level.

It should be noted that, regardless of being an N-type transistor or a P-type transistor, the photosensitive transistor T3 is turned on as long as the photosensitive transistor T3 is exposed to light. When the photosensitive transistor T3 is turned on by light irradiation, the touch signal outputted from the photosensitive transistor T3 to the first thin film transistor T1 is related to the intensity of the light irradiated to the photosensitive transistor T3. When the photosensitive transistor T3 is an N-type transistor, the greater the intensity of the light is, the smaller the touch signal is. When the photosensitive transistor T3 is a P-type transistor, the greater the light intensity is, the greater the touch signal is.

Further, in the present exemplary embodiment, in the display control stage, since the third thin film transistor T3 is in an OFF state, charging and discharging of the first storage capacitor does not affect charges stored in the second storage capacitor. In the touch control stage, since the second thin film transistor is in the OFF state, charging and discharging of the second storage capacitor does not affect charges stored in the first storage capacitor and the liquid crystal capacitor. Therefore, the present exemplary embodiment may reduce noise and improve display quality.

In comparison with the prior art, in the present exemplary embodiment, the data signal lines may be used for data input in the display control stage and also for data output in the touch control stage, i.e., the data signal lines may be used multiply, which may simplify a circuit structure and improve an aperture rate.

In comparison with the prior art, in the present exemplary embodiment, the first switch transistor T1 may transmit the data signal on the data signal line to the driving switch unit for displaying in the display control stage, and may also output the signal in the second storage capacitor to the data signal line in the touch control stage, i.e. the first switch transistor may be used multiply, thereby simplifying the circuit structure and further increasing the aperture ratio.

It should be noted that the first thin film transistor T1 and the third thin film transistor T3 of the present exemplary embodiment are realized by N-type thin film transistors and the second thin film transistor T2 is realized by a P-type thin film transistor, but those skilled in the art will appreciate that, in the exemplary embodiment of the present disclosure, the first thin film transistor T1 and the third thin film transistor T3 may also be P-type transistors, and in this case, the second thin film transistor T2 is an N-type thin film transistor, which also falls within the protection scope of the present disclosure.

Figure 4:
FIG. 4 schematically shows a driving timing diagram of a photosensitive touch circuit according to another exemplary embodiment of the present disclosure.
Figure 4:
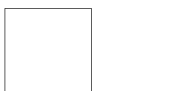
Figure 4:
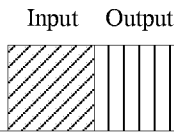

Further, in the present exemplary embodiment, when both the first thin film transistor T1 and the third thin film transistor T3 are P-type thin film transistors and the second thin film transistor T2 is an N-type thin film transistor, the driving timing of the photosensitive touch circuit is shown in FIG. 4. In the display control stage, the selection control signal Select is at a low level, the touch control signal Touch is at a high level, the rising edge of the touch control signal has a same timing as the falling edge of the selection control signal, the data signal is at a high level, and the data signal line is in a data input state. In the touch control stage, the selection control signal is at a low level, the touch control signal is at a low level, the falling edge of the touch control signal is in a low level range of the selection control signal, the data line is at a high level, and the data signal line is in a data output state.

Figure 5:
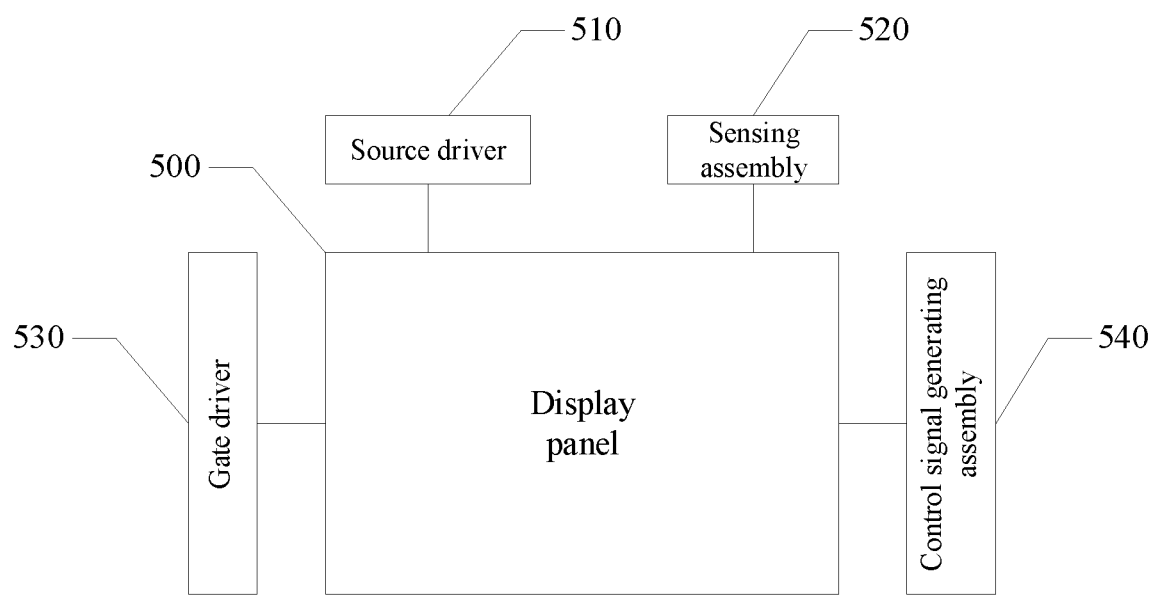
FIG. 5 schematically shows a block diagram of a display panel according to another exemplary embodiment of the present disclosure.

The exemplary embodiments of the present disclosure further provide a display panel. As shown in FIG. 5, the display panel 500 includes a source driver 510, a sensing assembly 520, a gate driver 530, and a control signal generating assembly 540. In addition, the display panel 500 may further include the data signal line DL, the selection control line Select and the touch control line Touch. The respective unit of the display panel 500 will be described in detail below.

In the present example embodiment, the source drive 510 generates the data signal. The data signal line DL is connected to the source driver 510 and the first terminal of the first switch unit, applies the data signal to the first terminal of the first switch unit and outputs the signal in the second storage capacitor. The sensing assembly is connected to the data signal line DL, senses a position of a touch operation based on the signal in the second storage capacitor outputted from the data signal line DL. The gate driver generates the first control signal. The selection control line is connected to the gate driver and the control terminal of the first switch unit, and transmits the first control signal to the control terminal of the first switch unit. The control signal generating assembly 540 generates the second control signal and the third control signal. The touch control line Touch is connected to the control terminal of the driving switch unit and the control terminal of the photosensitive switch unit, and transmits the second control signal and the third control signal.

Further, since the display panel 500 includes the above-described photosensitive touch circuit, and the included photosensitive touch circuit reduces one line in the longitudinal direction as compared with the prior art and the number of switch units is small, the circuit structure is simpler, so that the aperture ratio is improved. Since the included photosensitive touch circuit may prevent charging/discharging of capacitor from affecting each other, noise is reduced and a display quality is improved.

Further, the display panel in the present exemplary embodiment may be a liquid crystal display panel, an OLED (Organic Light Emitting Diode) display panel, a PLED (Polymer Light Emitting Diode) display panel, a PDP (Plasma Display Panel) display panel and other flat panel display panel, and a type of the display panel is not limited herein.

It should be noted that details of respective module unit in the display panel have been described in detail in the corresponding photosensitive touch circuit, and therefore will not be repeated herein.

In addition, in the present exemplary embodiment, there is also provided a control method of a photosensitive touch circuit for controlling the above-described photosensitive touch circuit, which may include: in a display stage, controlling the first switch unit to be turned on by the first control signal, controlling the driving switch unit to be turned on and the photosensitive switch unit to be turned off by the second control signal, and transmitting the data signal on the data signal line to the driving switch unit through the driving switch unit for displaying; and in a touch stage, controlling the first switch unit to be turned on by the first control signal, controlling the driving switch unit to be turned off and the photosensitive switch unit to be turned on by the second control signal, generating a touch signal in response to a touch operation and storing a generated signal in the second storage capacitor, and outputting a signal in the second storage capacitor to the data signal line through the first switch unit.

In the control method of a photosensitive control circuit according to the present exemplary embodiment, on one hand, the data signal line and the first switch unit may be used multiply, so that the circuit structure may be simplified, and thus an aperture ratio may be increased. On the other hand, the driving switch unit and the photosensitive switch unit are controlled to be turned on/off by the second control signal, which may prevent charging/discharging of storage capacitors from being affected by one another, so that noise may be reduced and display quality may be improved.

It should be noted that, in the present exemplary embodiment, the first control signal may be the selection control signal shown in FIG. 3, and the second control signal may be the touch control signal shown in FIG. 3.

It should be noted that, in the present exemplary embodiment, both the first thin film transistor and the third thin film transistor may be N-type thin film transistors, and in the case where both the first thin film transistor and the third thin film transistor are N-type thin film transistors, the second thin film transistor is a P-type thin film transistor. However, the exemplary embodiment of the present disclosure is not limited thereto, for example, both the first thin film transistor and the third thin film transistor may be P-type thin film transistors, and in the case where both the first thin film transistor and the third thin film are P-type thin film transistors, the second thin film transistor is an N-type thin film transistor. Since the display control stage and the touch control stage of the photosensitive touch circuits with different types of transistors have been described in detail above, and thus will not be repeated.

In addition, although the steps of the method of the present disclosure have been described in a specific order in the drawings, it is not intended or implied that the steps must be performed in that particular order or all the steps shown must be performed to achieve a desired result. Additionally or optionally, some steps may be omitted, multiple steps may be combined into one step, and/or one step may be divided into multiple steps.

It will be readily understood by those skilled in the art from the description of the above embodiments that, the exemplary embodiments described herein may be implemented by software or by means of software in conjunction with necessary hardware. Thus, the technical solution according to the embodiments of the present disclosure may be embodied in the form of a software product, which may be stored on a nonvolatile storage medium (which may be a CD-ROM, a USB flash disk, a mobile hard disk, etc.) or on a network, and may include a number of instructions to enable a computing device (which may be a personal computer, a server, a mobile terminal, or a network device, etc.) to perform the method according to the embodiments of the present disclosure.

The exemplary embodiments of the present disclosure provide a photosensitive touch circuit and a control method thereof, and a display panel, which may transmit the data signal on the data signal line to the driving switch unit for displaying through the first switch unit in the display control stage, and output the signal in the second storage capacitor to the data signal line through the first switch unit in the touch control stage. On one hand, in comparison with the prior art, the data signal line and the first switch unit may be used multiply, so that a longitudinal line is reduced and the number of switch units is relatively small, which simplifies the circuit structure, and thus an aperture ratio may be increased. On the other hand, the driving switch unit and the photosensitive switch unit are controlled to be turned on/off by the second control signal, which may prevent charging/discharging of storage capacitors from being affected by one another, so that noise may be reduced and display quality may be improved.

Other embodiments of the present disclosure will be readily apparent to those skilled in the art upon consideration of the specification and after practicing the present disclosure disclosed herein. This application intends to cover any variations, uses, or adaptive changes of the present disclosure, which follow the general principle of the present disclosure and include the common knowledge or conventional technical means not disclosed in present disclosure. The specification and embodiments are to be regarded as illustrative only, and the true scope and spirit of the present disclosure are restricted by the appended claims.

What is claimed is:

1. A display device, comprising a photosensitive touch circuit, the photosensitive touch circuit comprising a first switch, a driving switch, a photosensitive switch, a first storage capacitor, and a second storage capacitor, wherein:
    the first switch is connected to a data signal line and is configured to be turned on in response to a first control signal, to transmit a data signal on the data signal line to the driving switch;
    the driving switch is connected to a liquid crystal capacitor and the first storage capacitor, and is configured to be turned on in response to a second control signal, to write a received data signal to the liquid crystal capacitor and the first storage capacitor;
    the photosensitive switch is connected to the second storage capacitor, is configured to generate a touch signal in response to an optical signal and to store a generated signal to the second storage capacitor, and is configured to be turned on in response to a third control signal, to output a signal in the second storage capacitor to the data signal line through the first switch; and
    wherein the first switch comprises a first thin film transistor, the driving switch comprises a second thin film transistor, and the photosensitive switch includes a third thin film transistor,
    the first thin film transistor comprises a first terminal connected to the data signal line, a second terminal connected to a first terminal of the second thin film transistor, and a control terminal receiving the first control signal,
    the second thin film transistor comprises the first terminal connected to the second terminal of the first thin film transistor, a second terminal connected to the liquid crystal capacitor and the first storage capacitor, and a control terminal receiving the second control signal, and
    the third thin film transistor comprises a first terminal connected to the second terminal of the first thin film transistor, a second terminal connected to the second storage capacitor, and a control terminal receiving the third control signal.

2. The photosensitive touch circuit according to claim 1, wherein the first thin film transistor and the third thin film transistor are N-type thin film transistors, and the second thin film transistor is a P-type thin film transistor.

3. The photosensitive touch circuit according to claim 1, wherein the first thin film transistor and the third thin film transistor are P-type thin film transistors, and the second thin film transistor is an N-type thin film transistor.

4. The photosensitive touch circuit according to claim 1, wherein the second storage capacitor comprises a first terminal connected to the second terminal of the third thin film transistor, and a second terminal connected to a second control signal line.

5. The photosensitive touch circuit according to claim 1, wherein both of a first terminal of the first storage capacitor and a first terminal of the liquid crystal capacitor are connected to the second terminal of the second thin film transistor, and both of a second terminal of the first storage capacitor and a second terminal of the liquid crystal capacitor are connected to a common electrode.

6. The display device according to claim 1, further comprising:
    a source driver, configured to generate the data signal;
    the data signal line, connected to the source driver and the first terminal of the first switch, and configured to apply the data signal to the first terminal of the first switch and to output the signal in the second storage capacitor;
    a sensing assembly, connected to the data signal line, and configured to sense a position of a touch operation based on the signal in the second storage capacitor outputted from the data signal line;
    a gate driver, configured to generate the first control signal;
    a selection control line, connected to the gate driver and the control terminal of the first switch, and configured to transmit the first control signal to the control terminal of the first switch;
    a control signal generating assembly, configured to generate the second control signal and the third control signal; and
    a touch control line, connected to the control terminal of the driving switch and the control terminal of the photosensitive switch, and configured to transmit the second control signal and the third control signal.

7. The display device according to claim 6, wherein a rising edge of the second control signal is within in a high level range of the first control signal, and a falling edge of the second control signal has a same timing as a falling edge of the first control signal.

8. The display device according to claim 6, wherein a falling edge of the second control signal is within in a low level range of the first control signal, and a rising edge of the second control signal has a same timing as a rising edge of the first control signal.

9. A control method of a photosensitive touch circuit, which is configured to control the photosensitive touch circuit according to claim 1, comprising:
  in a display stage, controlling the first switch to be turned on by the first control signal, controlling the driving switch to be turned on and the photosensitive switch to be turned off by the second control signal, and transmitting the data signal on the data signal line to the driving switch through the driving switch for displaying; and
  in a touch stage, controlling the first switch to be turned on by the first control signal, controlling the driving switch to be turned off and the photosensitive switch to be turned on by the second control signal, generating a touch signal in response to a touch operation and storing a generated signal in the second storage capacitor, and outputting a signal in the second storage capacitor to the data signal line through the first switch.

* * * * *